US009662986B2

(12) United States Patent
Lee (10) Patent No.: US 9,662,986 B2
(45) Date of Patent: May 30, 2017

(54) SWITCH CIRCUIT AND MOTOR ENERGY RECYCLING SYSTEM

(71) Applicant: Nuvoton Technology Corporation, Hsinchu (TW)

(72) Inventor: Pang-Neng Lee, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 512 days.

(21) Appl. No.: 14/288,401

(22) Filed: May 28, 2014

(65) Prior Publication Data

US 2015/0251554 A1    Sep. 10, 2015

(30) Foreign Application Priority Data

Mar. 10, 2014 (TW) .............................. 103108199 A (51) Int. Cl.
| | | |
|---|---|---|
| *H02P 1/00* | (2006.01) | |
| *B60L 11/18* | (2006.01) | |
| *B60L 11/00* | (2006.01) | |
| *B60L 3/00* | (2006.01) | |

(52) U.S. Cl.
CPC ......... *B60L 11/1803* (2013.01); *B60L 3/0046* (2013.01); *B60L 11/005* (2013.01); *B60L 11/007* (2013.01); *B60L 11/1805* (2013.01); *B60L 11/1816* (2013.01); *B60L 11/1853* (2013.01); *B60L 11/1864* (2013.01); *B60L 2200/12* (2013.01); *Y02T 10/7005* (2013.01); *Y02T 10/7022* (2013.01); *Y02T 10/7061* (2013.01); *Y02T 10/7072* (2013.01); *Y02T 90/14* (2013.01); *Y10T 307/313* (2015.04)

(58) Field of Classification Search
CPC .. B60L 11/1851; B60L 11/005; B60L 11/1803
USPC ........................................................ 318/139
See application file for complete search history.

(56) References Cited

U.S. PATENT DOCUMENTS

| | | | | |
|---|---|---|---|---|
| 6,157,165 A | * | 12/2000 | Kinoshita ............. | H02J 7/0019 320/116 |
| 6,741,065 B1 | | 5/2004 | Ishii et al. | |
| 2009/0075174 A1 | | 3/2009 | Mori | |
| 2013/0257383 A1 | * | 10/2013 | Shim ........................ | H02J 3/32 320/134 |
| 2014/0009106 A1 | * | 1/2014 | Andrea ................... | H02H 9/002 320/107 |

(Continued)

FOREIGN PATENT DOCUMENTS

| | | |
|---|---|---|
| CN | 1309569 C | 4/2007 |
| CN | 201287794 Y | 8/2009 |
| CN | 101531142 A | 9/2009 |

(Continued)

*Primary Examiner* — Eduardo Colon Santana
*Assistant Examiner* — Gabriel Agared
(74) *Attorney, Agent, or Firm* — CKC & Partners Co., Ltd.

(57) ABSTRACT

A switch circuit and a motor energy recycling system are disclosed herein. The switch circuit includes a power unit and a switch module. The power unit includes a first battery and a second battery, in which the first battery is configured to supply the electrical energy and the second battery is configured to store the electrical energy. The switch module is configured to switch the first battery to store the electrical energy and to switch the second battery to supply the electrical energy, according to a switch signal.

15 Claims, 4 Drawing Sheets

(56) References Cited

U.S. PATENT DOCUMENTS

2014/0009855 A1\* 1/2014 Yamamoto .............. H02M 1/32
 361/42
2014/0167654 A1\* 6/2014 Brockerhoff ............. H02P 7/00
 318/139

FOREIGN PATENT DOCUMENTS

| CN | 201872629 U | 6/2011 |
| CN | 101716889 B | 7/2012 |
| TW | I404295 B | 8/2013 |

\* cited by examiner

SWITCH CIRCUIT AND MOTOR ENERGY RECYCLING SYSTEM

RELATED APPLICATIONS

This application claims priority to Taiwanese Patent Application Serial Number 103108199, filed Mar. 10, 2014, which is herein incorporated by reference.

BACKGROUND

Technical Field

The present disclosure relates to a switch circuit. More particularly, the present disclosure relates to a switch circuit in a motor energy recycling system.

Description of Related Art

Conventional motor-driven bicycles can be operated in a motor-driven mode and a manual operation mode. Therefore, if users do not ride the bicycles in the manual operation mode, they can choose to ride the bicycles operated in the motor-driven mode. However, when the bicycles brake to stop, motors of the bicycles continue to work due to inertia of the bicycles, thereby causing waste of electrical power. Moreover, conventional motor-driven bicycles only have equipments to be charged with electrical supply mains, and thus the bicycles cannot be charged anytime and could be very inconvenient if electrical power is insufficient.

SUMMARY

An aspect of the present disclosure is related to a switch circuit. The switch circuit includes a power unit and a switch module. The power unit includes a first battery and a second battery, in which the first battery is configured to supply electrical energy, and the second battery is configured to store electrical energy. The switch module is configured to switch the first battery to store electrical energy and configured to switch the second battery to supply electrical energy, according to a switch signal.

Another aspect of the present disclosure is related to a motor energy recycling system. The motor energy recycling system includes a motor, an energy recycling circuit, and a switch circuit. The motor is configured to generate energy according to a driving signal. The energy recycling circuit is electrically coupled to the motor and configured to recycle the energy from the motor. The switch circuit is electrically coupled to the energy recycling circuit. The switch circuit includes a power unit and a switch module. The power unit includes a first battery and a second battery, in which the first battery is configured to supply electrical energy, and the second battery is configured to store the energy. The switch module is configured to switch the first battery to store the energy and configured to switch the second battery to supply electrical energy, according to a switch signal.

Yet another aspect of the present disclosure is related to a switch circuit. The switch circuit includes a voltage dividing unit, a processing unit and a switch module. The voltage dividing unit is electrically coupled to a first battery and a second battery, and the voltage dividing unit is configured to divide voltages to generate a first corresponding voltage and a second corresponding voltage. The processing unit is electrically coupled to the voltage dividing unit, and the processing unit is configured to generate a switch signal according to the first corresponding voltage and the second corresponding voltage. The switch module is configured to switch the first battery from supplying electrical energy to storing electrical energy and configured to switch the second battery from storing electrical energy to supplying electrical energy, according to the switch signal.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of various embodiments, with reference to the accompanying drawings as follows.

DETAILED DESCRIPTION

In the following description, specific details are presented to provide a thorough understanding of the embodiments of the present disclosure. Persons of ordinary skill in the art will recognize, however, that the present disclosure can be practiced without one or more of the specific details, or in combination with other components. Well-known implementations or operations are not shown or described in detail to avoid obscuring aspects of various embodiments of the present disclosure.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

It will be understood that in the present disclosure, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

As used herein, the terms "comprising," "including," "having," "containing," "involving," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

Figure 1A:
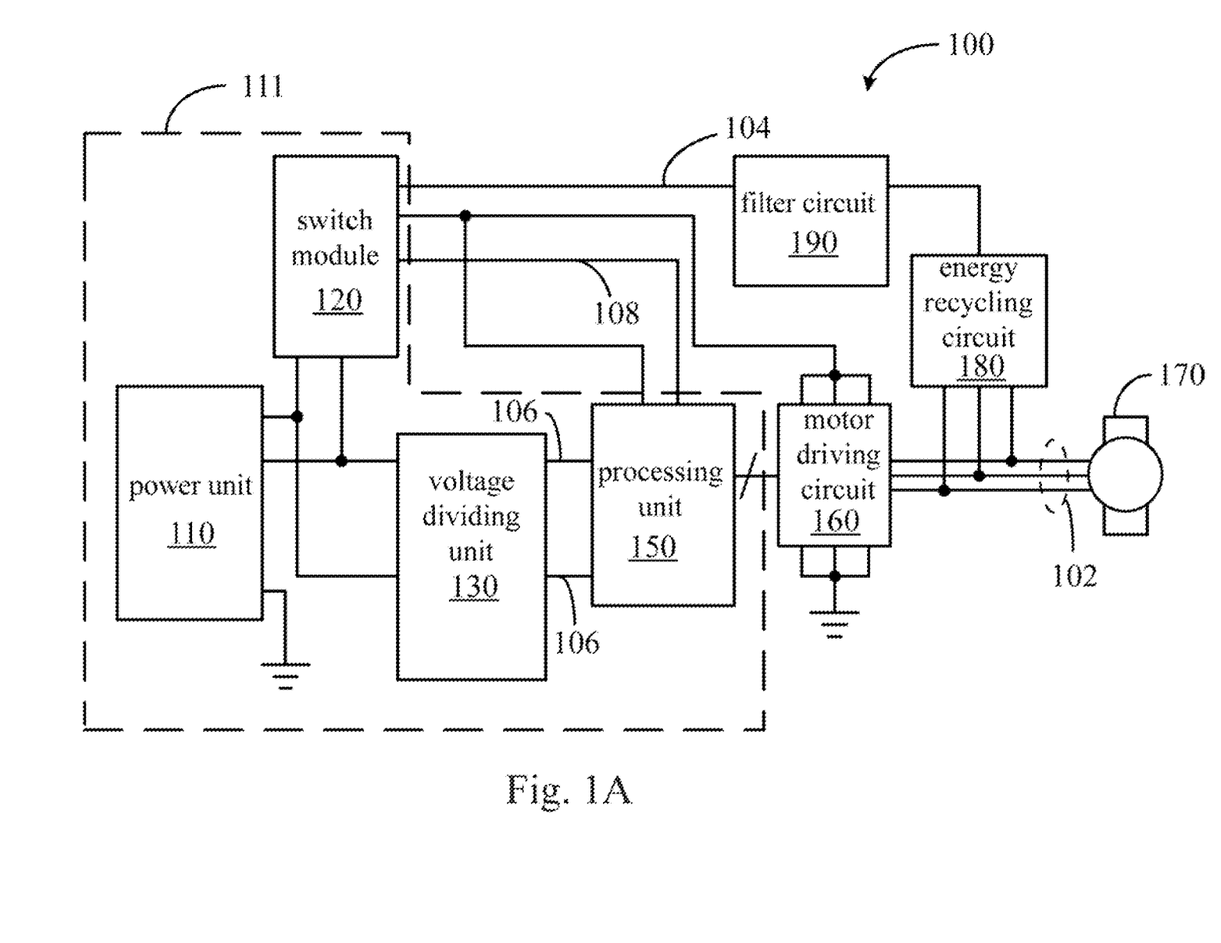
FIG. 1A is a schematic diagram of a motor energy recycling system according to one embodiment of the present disclosure.

FIG. 1A is a schematic diagram of a motor energy recycling system 100 according to one embodiment of the present disclosure. As illustrated in FIG. 1A, the motor energy recycling system 100 includes a switch circuit 111, a motor driving circuit 160, a motor 170, an energy recycling circuit 180, and a filter circuit 190. The motor driving circuit 160 is configured to drive the motor 170. When the motor 170 operates, corresponding energy is generated and recycled through the energy recycling circuit 180 and the filter circuit 190 to the switch circuit 111.

In one embodiment, the switch circuit 111 includes a power unit 110 and a switch module 120, in which the power unit 110 includes a plurality of batteries (not shown) respectively configured to supply electrical energy and to store electrical energy.

Figure 1B:
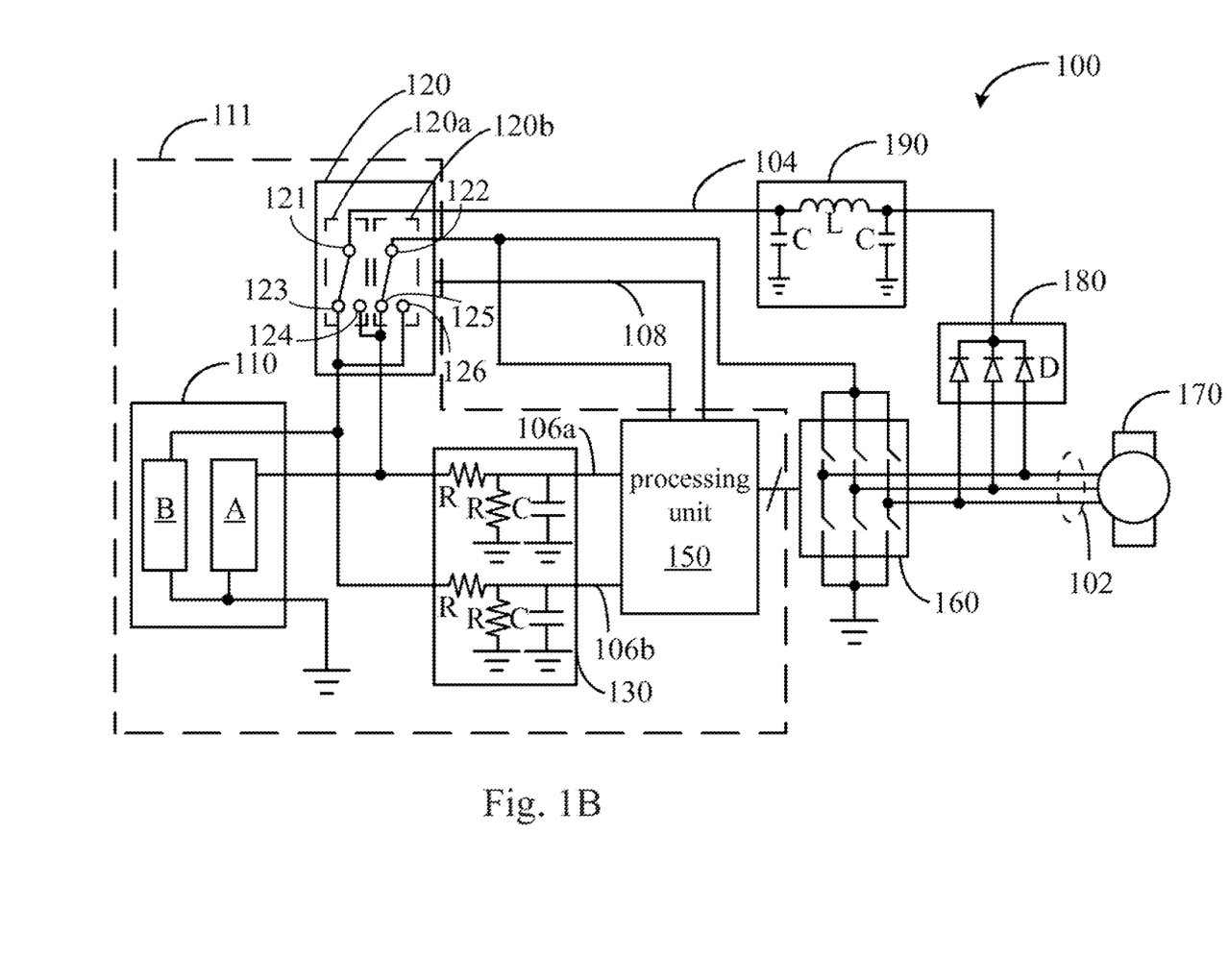
FIG. 1B is a schematic diagram of a motor energy recycling system according to another embodiment of the present disclosure.

In one further embodiment, the power unit 110 can include at least one power supply battery (e.g., a battery A in FIG. 1B) and at least one energy storing battery (e.g., a battery B in FIG. 1B). The power supply battery is configured to supply the electrical energy through the switch module 120 to the motor driving circuit 160, such that the motor driving circuit 160 generates a driving signal 102 for driving the motor 170. In another embodiment, the power supply battery is configured to supply the electrical energy to drive the motor 170, the energy storing battery is configured to store the electrical energy from the energy recycling circuit 180, in which the energy recycling circuit 180 is configured to recycle redundant energy of the motor 170.

As illustrated in FIG. 1A, the motor 170 is electrically coupled to the energy recycling circuit 180. When the motor 170 generates the energy according to the driving signal 102, the energy recycling circuit 180 is configured to recycle the energy generated from the motor 170. Moreover, the filter circuit 190 is electrically coupled between the energy recycling circuit 180 and the switch module 120, and configured to filter and store the electrical energy recycled by the energy recycling circuit 180 to generate a stable direct-current (DC) voltage 104.

In the present embodiment, the power unit 110 is electrically coupled to the switch module 120, and configured to receive the stable DC voltage 104 through the switch module 120, such that the energy storing battery in the power unit 110 stores the energy corresponding to the stable DC voltage 104. In other words, when the motor 170 operates, the energy correspondingly generated during the operation of the motor 170 is recycled to the power unit 110, such that the power unit 110 further can be configured to store the energy generated when the motor 170 operates, in addition to supplying the electrical energy.

Furthermore, the motor 170 can be applied in vehicles. For example, when the motor driving circuit 160 drives the motor 170 to operate, the motor 170 generates a back electromotive force (Back-EMF) and the energy corresponding to a sensed motor voltage. When the vehicles brake to stop, the motor driving circuit 160 stops driving the motor 170, and the motor 170 is operated as a power generator due to inertia rotation. Therefore, the energy generated in the state of the motor 170 being operated as the power generator is also recycled through the same path to the power unit 110.

In a further embodiment, the switch circuit 111 can further include a voltage dividing unit 130 and a processing unit 150. The voltage dividing unit 130 is electrically coupled to the power unit 110 and the processing unit 150, and configured to divide voltages corresponding to the electrical energy stored by the batteries in the power unit 110, to generate corresponding voltages 106. The voltage dividing unit 130 is configured to divide the voltages of the batteries in the power unit 110, such that the generated corresponding voltages 106 are within an acceptable range of the voltage (e.g., 0-5 volts) with which the processing unit 150 is operated, for the processing unit 150 to determine an electrical quantity of each of the batteries in the power unit 110. Moreover, the motor driving circuit 160 is electrically coupled between the processing unit 150 and the motor 170.

In operation, when the processing unit 150 determines that the electrical quantity of the energy storing battery is greater than the electrical quantity of the power supply battery by a specific range, according to the corresponding voltages 106, the processing unit 150 generates a switch signal 108 for the switch module 120 to perform switching operations of the batteries. For illustration, the processing unit 150 can be a micro-control unit (MCU), a programmable micro-processor, an application specific integrated circuit (ASIC) for motor driving, or a comparator, but it is not limited thereto. In addition, the micro-control unit (MCU) can further include a memory unit, a processor unit, a pulse width modulation (PWM) signal output unit, an analog/digital converter and/or an input/output (I/O) interface.

In addition, the switch module 120 is electrically coupled to the power unit 110 and the processing unit 150. The switch module 120 is configured to switch the power supply battery from supplying the electrical energy to storing the electrical energy, and to switch the energy storing battery from storing the electrical energy to supplying the electrical energy, according to the switch signal 108.

As a result, in the motor energy recycling system 100, the batteries in the power unit 110 can store and supply the electrical energy efficiently through the switch module 120 and the processing unit 150, such that the recycling and use of the electrical energy can be more efficient.

For convenience of illustration, the power unit 110 can be configured to include a battery A and a battery B, in which the battery A is configured to supply the electrical energy, and the battery B is configured to store the electrical energy. For illustration, the amount and function of the aforementioned batteries are only for illustrative of the present embodiment but not limiting of the present disclosure.

In some embodiments, the switch module 120 includes a number of switches, and the amount of the switches can be changed according to practical needs by one of ordinary skill in the art. In one embodiment, as illustrated in FIG. 1B, the switch module 120 includes switches 120a and 120b. The switch 120a has terminals 121, 123, 124, in which the terminal 121 is electrically coupled to the filter circuit 190, the terminal 123 is electrically coupled to the battery B, and the terminal 124 is electrically coupled to the battery A. Moreover, the switch 120b has terminals 122, 125, 126, in which the terminal 122 is electrically coupled to the motor driving circuit 160, the terminal 125 is electrically coupled to the battery A, and the terminal 126 is electrically coupled to the battery B.

For illustration, the switches included in the switch module 120 can be a relay, a metal oxide semiconductor field-effect transistor (MOSFET), a bipolar junction transistor (BJT), or an insulated gate bipolar transistor (IGBT), but it is not limited thereto.

Figure 1C:
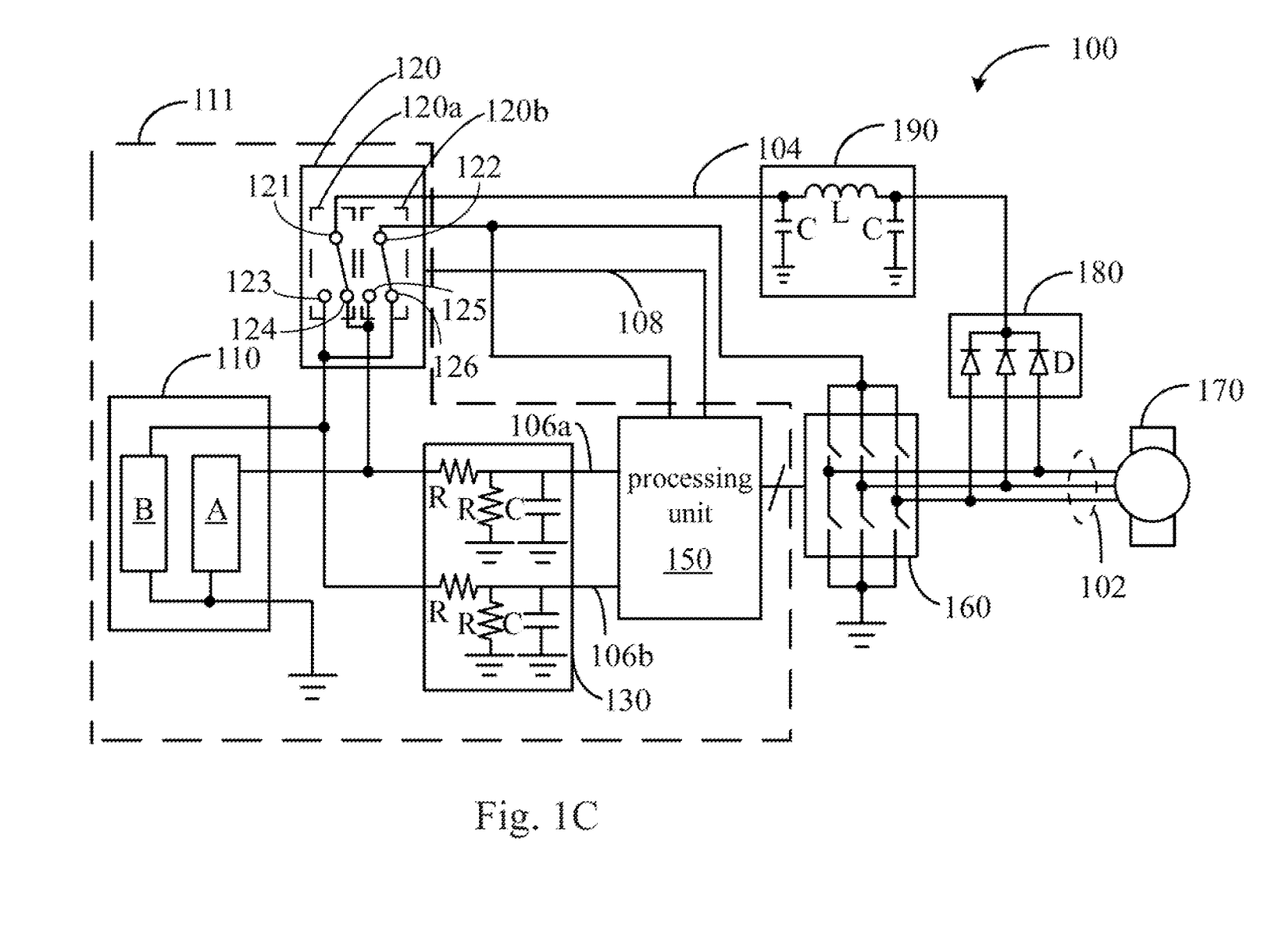
FIG. 1C is a schematic diagram of a motor energy recycling system according to yet another embodiment of the present disclosure.

In operation, the switch module 120 performs switching to the switches 120a and 120b in response to the switch signal 108, such that the power supply battery is connected to a power supply loop, and the energy storing battery is switched to be connected to an energy storing loop. Specifically, when the terminal 121 and the terminal 123 of the switch 120a are connected, the terminal 122 and the terminal 125 of the switch 120b are connected (as shown in FIG. 1B); when the switch 120a is switched such that the terminal 121 and the terminal 124 are connected, the terminal 122 of the switch 120b is connected to the terminal 126 (as shown in FIG. IC). As a result, the corresponding power supply battery can be connected to the power supply loop, and the corresponding energy storing battery can be switched to be connected to the energy storing loop.

Under a predetermined condition, the terminal 121 is electrically coupled to the terminal 123, and the terminal 122 is electrically coupled to the terminal 125. The electrical energy is supplied from battery A through the terminal 125 and the terminal 122 in the motor energy recycling system 100, for the motor energy recycling system 100 and the motor driving circuit 160 to utilize. Furthermore, the motor energy recycling system 100 recycles and stores the electrical energy from the battery B through the energy recycling circuit 180, the filter circuit 190, the terminal 121 and the terminal 123.

For illustration, two batteries are shown in the present disclosure, but it is not limited thereto; in other words, more than two batteries can also be applied in the embodiments of the present disclosure, in which at least one battery is configured as a power supply battery, at least one battery is configured as an energy storing battery, and a modified switch module (including multiple switches) performs the switching operation in response to at least one switch signal. For example, if the power unit 110 includes three or more than three batteries, the switch module 120 can perform the switching operation in response to two or more than two switch signals.

As illustrated in FIG. 1B, the motor driving circuit 160 receives the electrical energy supplied by the battery A and generates the driving signal 102 for driving the motor 170. The driving signal 102 can be determined according to a type of the motor 170. Conventionally, a three-phase motor has 3 driving signal lines connected to the motor, and a single-phase has 2 driving signal lines connected to the motor. When the motor is driven to rotate, four kinds of unnecessary output ripples are usually generated, which include low-frequency ripples (i.e., ripples with 2 times the operating frequency), high-frequency ripples (i.e., ripples generated when the motor driving circuit 160 is switched), switching noise (i.e., noise with a frequency as same as that of PWM signal), and random noise (i.e., noise related to the operating frequency or the switching frequency). The aforementioned ripples or noise are unnecessary. When the aforementioned ripples or noise are fed back through parasitic diodes in the motor driving circuit 160 to the terminal 122, it would cause the power of the entire system to be unstable, even resulting in damages of devices.

In the present embodiment, the energy recycling circuit 180 includes multiple diodes D. The energy on the motor 170, which is greater than that corresponding to the supply voltage, is recycled through the diodes D in the energy recycling circuit 180. Explained in a different way, the energy recycling circuit 180 is a Back-EMF energy recycling circuit composed of the diodes D.

In addition, the filter circuit 190 can be π-type LC filter circuit. By using the filtering and energy storage performed by the inductor L and the capacitor C in the π-type LC filter circuit, the energy corresponding to the ripples or noise generated by the motor 170 can be transformed into the stable DC voltage 104.

As illustrated in FIG. 1B, the battery B receives and stores the DC voltage 104 through the terminal 121 and the terminal 123. At the moment, the processing unit 150 is configured to compare the electrical quantity of the battery A with that of the battery B through the voltage dividing unit 130.

For example, the voltage dividing unit 130 can be composed of two groups of voltage dividing circuits and low pass filtering circuits, which are configured to divide voltages corresponding to the electrical energy stored by the battery A and the battery B, respectively, to generate a first corresponding voltage 106a and a second corresponding voltage 106b.

Since the voltages (typically 12 volts or more than 12 volts) stored in the battery A and the battery B are greater than the operating voltage (e.g., 0-5 volts) within the acceptable range, of the processing unit 150, the electrical energy stored by the battery A and the battery B can be lowered to the operating voltage within the acceptable range, of the processing unit 150, by the voltage dividing unit 130, such that the processing unit 150 operates within a safe voltage input range to determine the electrical quantity of the battery A and the battery B.

In operation, when the processing unit 150 determines that the electrical quantity of the battery B is greater than the electrical quantity of the battery A by a specific range, according to the first corresponding voltage 106a and the second corresponding voltage 106b, the processing unit 150 generates the switch signal 108. At the moment, the switch module 120 switches the battery A from supplying the electrical energy to storing the electrical energy, and switches the battery B from storing the electrical energy to supplying the electrical energy, according to the switch signal 108.

For illustration, the processing unit 150 can further determine the switch between the power supplying operation and the energy storing operation of the battery A and the battery B, based on programmed configurations. For example, the processing unit 150 can determine a switching time point according to a sum of the first corresponding voltage 106a and a conduction voltage Dvd of the parasitic diodes in the motor driving circuit 160 and a sum of the second corresponding voltage 106b and a conduction voltage PVd of the diodes in the energy recycling circuit 180, which is indicated by a formula (VA+DVd)<(VB+PVd), in which VA is the voltage corresponding to the electrical quantity of the battery A configured for supplying power, and VB is the voltage corresponding to the electrical quantity of the battery B configured for storing energy.

Specifically, when the sum of the first corresponding voltage 106a and the conduction voltage Dvd of the parasitic diodes in the motor driving circuit 160 is smaller than the sum of the second corresponding voltage 106b and the conduction voltage PVd of the diodes in the energy recycling circuit 180, the processing unit 150 generates the switch signal 108, such that the switch module 120 perform switching operations of the battery A and the battery B. In other words, the switches 120a and 120b in the switch module 120 are synchronously switched according to the switch signal 108, such that the battery A is switched to store the electrical energy and the battery B is switched to supply the electrical energy. For illustration, the switch signal 108 is not limited to be transmitted on one switch signal line, and two switch signal lines can also be applied to control the switches 120a and 120b, respectively, in the present embodiment.

As illustrated in FIG. 1C, after the switch module 120 receives the switch signal 108, the switches 120a and 120b perform the corresponding switching operations according to the switch signal 108, such that the terminal 121 is electrically coupled to the terminal 124, and the terminal 122 is electrically coupled to the terminal 126. At the moment, in the motor energy recycling system 100, the electrical energy is supplied from the battery B through the terminal 126 and the terminal 122 to the motor driving circuit 160. Furthermore, in the motor energy recycling system 100, the electrical energy is recycled and stored by the battery A through the energy recycling circuit 180, the filter circuit 190, the terminal 121 and the terminal 124.

For illustration, the aforementioned determination of the switching time point is given only for illustrative purposes but not limiting of the present disclosure. Any skill or embodiment which is able to compare and/or determine electrical quantity of multiple batteries is within the contemplated scope of the present disclosure. For example, the processing unit 150 also can be replaced by a logic circuit (i.e., a comparator or an application specific integrated circuit (ASIC) for motor driving), or various sensing circuits (e.g., temperature, humidity, amplitude and/or illuminance sensors) can be added in the system to sense variations of other environmental factors. Moreover, communication circuits can further be added therein to transmit internal information through wired and/or wireless communication interfaces to a network or computer in order to carry out remote monitoring and control.

Figure 1D:
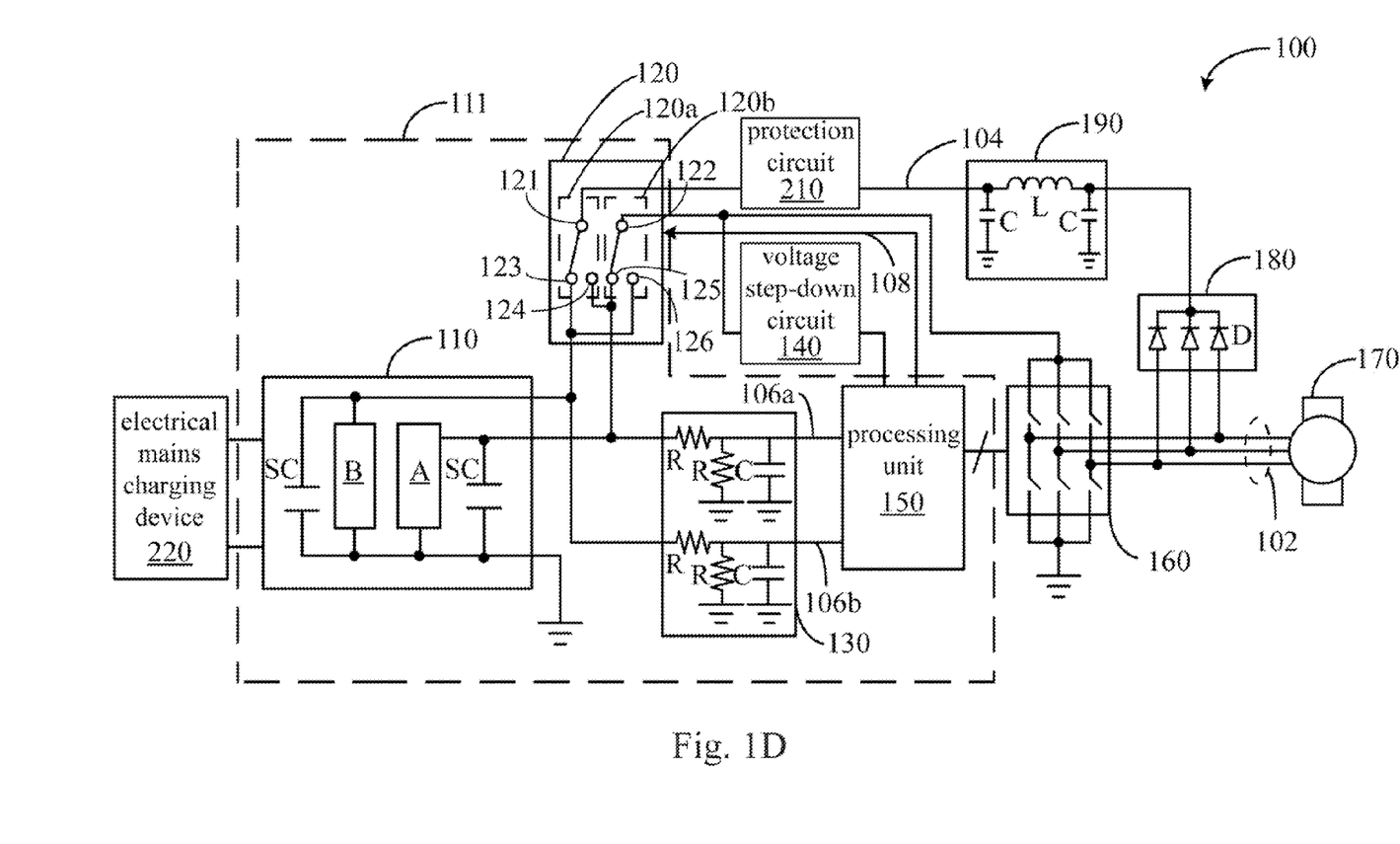
FIG. 1D is a schematic diagram of a motor energy recycling system according to still another embodiment of the present disclosure.

In one embodiment, reference is made to FIG. 1D, the power unit 110 in the switch circuit 111 further includes two super-capacitors SC coupled in parallel with the battery A and the battery B, respectively. Since the super-capacitors SC is a device with a large power density and its efficiency of storing electrical energy is two times or more than two times that of a secondary battery, the manner of the super-capacitors SC being coupled in parallel with the battery A and the battery B, respectively, can improve the efficiency of storing the electrical energy and supplying the electrical energy. For illustration, the battery A and/or the battery B can be super-capacitors, and can be configured to supply the electrical energy and/or store the electrical energy.

In one embodiment, as illustrated in FIG. 1D, the filter circuit 190 can be a π-type LC filter circuit including at least one of the super-capacitors SC, in which the energy corresponding to the ripples or noise generated by the motor 170 can be stored in the super-capacitor SC, and a ripple voltage corresponding thereto can be transformed into the stable DC voltage 104. In one embodiment, in the filter circuit 190, the capacitors C disposed at two sides of the inductor L both are super-capacitors. In another embodiment, the capacitor C disposed at one side of the inductor L is a super-capacitor.

In one embodiment, as illustrated in FIG. 1D, the motor energy recycling system 100 can further include a voltage step-down circuit 140, in which the voltage step-down circuit 140 is electrically coupled between the processing unit 150 and the switch module 120, and the voltage step-down circuit 140 is configured to lower a voltage corresponding to the electrical quantity of the battery A or the battery B, to an operating voltage within an acceptable range (e.g., 3.3-5 volts), of the processing unit 150 and/or peripheral circuits in the system.

In one embodiment, as illustrated in FIG. 1D, the motor energy recycling system 100 can further include a protection circuit 210, in which the protection circuit 210 is electrically coupled between the switch module 120 and the filter circuit 190, and the protection circuit 210 is configured to prevent a large current or an inrush current from flowing into the battery A or the battery B, in order to extend the lifetime of the battery A or the battery B.

In one embodiment, as illustrated in FIG. 1D, the power unit 110 also can be coupled to an electrical mains charging device 220. When the electrical quantity of the battery A and the battery B are lower, the battery A and the battery B can be charged by the electrical mains charging device 220.

Notably, the embodiments from FIG. 1A to FIG. 1D are given for illustrative purposes. Any one of ordinary skill in the art can make other designs or modifications of connections of the energy recycling circuit 180, the filter circuit 190 and the switch module 120 in the motor energy recycling system 100, such that the battery A recycles and stores the electrical energy and the battery B supplies the electrical energy for the motor to rotate at the same time.

Typically, a conventional motor energy recycling system transmits the energy collected by an energy collector, through a boost circuit and an anti-backflow device, back to a DC bus. However, the disadvantage is that loops of supplying power and storing energy are connected together. In such configuration, when the energy is transmitted through the boost circuit and the anti-backflow device back to the DC bus, this results in an increase of voltage ripples on the DC bus, such that the motor driving system becomes unstable. In addition, the conventional motor energy recycling system still needs the boost circuit, and this will result in additional cost of parts and power consumption. Moreover, once the boost circuit is used, the boosted voltage must be higher than the present voltage; however, the energy is not sufficient enough for increasing the voltage of the battery immediately, thus causing secondary ripple noise.

For the aforementioned embodiments, in regard to the present disclosure, multiple batteries in the power unit are controlled with switch operations to supply the electrical energy and recycle the redundant electrical energy, such that the power of the motor energy recycling system is more stable, particularly the part related to the motor driving circuit. In other words, the motor can be equipped with a self-control function, such that the motor can independently control energy arrangements due to an embedded controller. Furthermore, the skill in the present disclosure can be implemented to enhance the output power of the system and the efficiency of storing electrical energy, such that the lifetime of devices can increase, and the lifetime of the batteries can further be improved.

As is understood by one of ordinary skill in the art, the foregoing embodiments of the present disclosure are illustrative of the present disclosure rather than limiting of the present disclosure. It is intended to cover various modifications and similar arrangements included within the spirit and scope of the appended claims, the scope of which should be accorded with the broadest interpretation so as to encompass all such modifications and similar structures.

What is claimed is:

1. A switch circuit comprising:
   a power unit comprising a first battery and a second battery, wherein the first battery is configured to supply electrical energy, and the second battery is configured to store electrical energy;
   a voltage dividing unit electrically coupled to the power unit, the voltage dividing unit configured to divide voltages corresponding to the electrical energy stored by the first battery and the second battery to generate a first corresponding voltage and a second corresponding voltage;
   a processing unit electrically coupled to the voltage dividing unit, the processing unit configured to generate a switch signal according to the first corresponding voltage and the second corresponding voltage; and
   a switch module configured to switch the first battery to store electrical energy and configured to switch the second battery to supply electrical energy, according to the switch signal, wherein the processing unit is configured to determine that an electrical quantity of the second battery is greater than an electrical quantity of the first battery by a specific range, according to the first corresponding voltage and the second corresponding voltage, to generate the switch signal.

2. The switch circuit as claimed in claim 1, wherein the switch module comprises a plurality of switches, and the plurality of switches are configured to be synchronously switched according to the switch signal, such that the first battery is switched to store the electrical energy and the second battery is switched to supply the electrical energy.

3. The switch circuit as claimed in claim 1, wherein each of the first battery and the second battery is electrically coupled in parallel with a super-capacitor.

4. The switch circuit as claimed in claim 1, wherein the first battery is configured to supply the electrical energy to drive a motor, the second battery is configured to store the electrical energy from an energy recycling circuit, and the energy recycling circuit is configured to recycle redundant energy of the motor.

5. A motor energy recycling system, comprising:
   a motor configured to generate energy according to a driving signal;
   an energy recycling circuit electrically coupled to the motor and configured to recycle the energy from the motor; and
   a switch circuit electrically coupled to the energy recycling circuit, the switch circuit comprising:
      a power unit comprising a first battery and a second battery,
   wherein the first battery is configured to supply electrical energy, and the second battery is configured to store the energy;
      a voltage dividing unit configured to divide voltages corresponding to electrical energy stored by the first battery and the second battery to generate a first corresponding voltage and a second corresponding voltage;
      a processing unit electrically coupled to the voltage dividing unit, the processing unit configured to generate a switch signal according to the first corresponding voltage and the second corresponding voltage; and
      a switch module configured to switch the first battery to store the energy and configured to switch the second battery to supply electrical energy, according to the switch signal,
   wherein when a sum of the second corresponding voltage and a conduction voltage of a plurality of diodes in the energy recycling circuit is greater than a sum of the first corresponding voltage and a conduction voltage of a plurality of parasitic diodes in a motor driving circuit, the processing unit is configured to generate the switch signal, wherein the motor driving circuit is electrically coupled between the processing unit and the motor and configured to generate the driving signal for driving the motor.

6. The motor energy recycling system as claimed in claim 5, wherein the processing unit is configured to determine that an electrical quantity of the second battery is greater than an electrical quantity of the first battery by a specific range, according to the first corresponding voltage and the second corresponding voltage, to generate the switch signal.

7. The motor energy recycling system as claimed in claim 5, wherein the switch module comprises a plurality of switches, and the plurality of switches are configured to be synchronously switched according to the switch signal, such that the first battery is switched to store the electrical energy and the second battery is switched to supply the electrical energy.

8. The motor energy recycling system as claimed in claim 5, further comprising:
   a filter circuit electrically coupled between the energy recycling circuit and the switch module, the filter circuit configured to filter and store the electrical energy to generate a direct-current (DC) voltage.

9. The motor energy recycling system as claimed in claim 8, wherein the filter circuit comprises a π-type LC filter circuit.

10. The motor energy recycling system as claimed in claim 5, further comprising:
    a voltage step-down circuit electrically coupled between the processing unit and the switch module, the voltage step-down circuit configured to lower a voltage corresponding to an electrical quantity of the first battery or the second battery, to an operating voltage within an acceptable range, of the processing unit.

11. The motor energy recycling system as claimed in claim 5, wherein each of the first battery and the second battery is electrically coupled in parallel with a super-capacitor.

12. A switch circuit comprising:
    a voltage dividing unit electrically coupled to a first battery and a second battery, the voltage dividing unit configured to divide voltages to generate a first corresponding voltage and a second corresponding voltage;
    a processing unit electrically coupled to the voltage dividing unit, the processing unit configured to generate a switch signal according to the first corresponding voltage and the second corresponding voltage; and
    a switch module configured to switch the first battery from supplying electrical energy to storing electrical energy and configured to switch the second battery from storing electrical energy to supplying electrical energy, according to the switch signal,
    wherein the processing unit is configured to determine that an electrical quantity of the second battery is greater than an electrical quantity of the first battery by a specific range, according to the first corresponding voltage and the second corresponding voltage to generate the switch signal.

13. The switch circuit as claimed in claim 12, wherein the switch module comprises a plurality of switches, and the plurality of switches are configured to be synchronously switched according to the switch signal, such that the first battery is switched to store the electrical energy and the second battery is switched to supply the electrical energy.

14. The switch circuit as claimed in claim 12, wherein each of the first battery and the second battery is electrically coupled in parallel with a super-capacitor.

15. The switch circuit as claimed in claim 12, wherein the first battery is configured to supply the electrical energy to drive a motor, the second battery is configured to store the electrical energy from an energy recycling circuit, and the energy recycling circuit is configured to recycle redundant energy of the motor.

* * * * *